United States Patent
Kim

(10) Patent No.: US 7,630,348 B2
(45) Date of Patent: Dec. 8, 2009

(54) WIRELESS LOCAL AREA NETWORKS AND METHODS FOR ESTABLISHING DIRECT LINK PROTOCOL (DLP) COMMUNICATIONS BETWEEN STATIONS OF WIRELESS LOCAL AREA NETWORKS

(75) Inventor: Sang-hee Kim, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 1181 days.

(21) Appl. No.: 10/729,493

(22) Filed: Dec. 5, 2003

(65) Prior Publication Data
US 2004/0246934 A1 Dec. 9, 2004

(30) Foreign Application Priority Data
Feb. 27, 2003 (KR) .................. 10-2003-0012327

(51) Int. Cl.
*H04W 4/00* (2009.01)
(52) U.S. Cl. ...................... 370/338; 370/908
(58) Field of Classification Search ............. 370/338, 370/351, 908, 912, 913; 455/456.1, 456.5, 455/456.6, 12.1, 41.1, 41.2, 427, 445
See application file for complete search history.

(56) References Cited

U.S. PATENT DOCUMENTS

| | | | | |
|---|---|---|---|---|
| 5,666,661 A | * | 9/1997 | Grube et al. | 455/509 |
| 5,822,682 A | * | 10/1998 | Schroderus et al. | 370/349 |
| 6,580,704 B1 | * | 6/2003 | Wellig et al. | 370/338 |
| 6,785,253 B1 | * | 8/2004 | Du | 370/338 |
| 6,791,962 B2 | * | 9/2004 | Wentink | 370/338 |
| 7,000,015 B2 | * | 2/2006 | Moore et al. | 455/456.1 |
| 7,095,722 B1 | * | 8/2006 | Walke et al. | 370/338 |

FOREIGN PATENT DOCUMENTS

| | | |
|---|---|---|
| KR | 10-2002-0053223 | 7/2002 |
| KR | 10-2002-0074313 | 9/2002 |

OTHER PUBLICATIONS

Notice to Submit a Response for Korean patent application No. Oct. 2003-0012327 mailed on Apr. 28, 2005.

* cited by examiner

*Primary Examiner*—Quochieng B Vuong
(74) *Attorney, Agent, or Firm*—Myers Bigel Sibley & Sajovec

(57) ABSTRACT

Methods of establishing communications between a first station and a second station in a wireless local area network using a direct link protocol are disclosed in which a first distance between the first station and the second station and a second distance between the first station and an access point in the wireless local area network are determined. The first distance may then be compared to the second distance. Direct link protocol communications between the first station and the second station may be established if the first distance is less than the second distance.

25 Claims, 5 Drawing Sheets

1: BEST
2: GOOD
3: WORST

US 7,630,348 B2

WIRELESS LOCAL AREA NETWORKS AND METHODS FOR ESTABLISHING DIRECT LINK PROTOCOL (DLP) COMMUNICATIONS BETWEEN STATIONS OF WIRELESS LOCAL AREA NETWORKS

BACKGROUND OF THE INVENTION

This application claims the priority of Korean Patent Application No. 10-2003-12327, filed on Feb. 27, 2003, in the Korean Intellectual Property Office, the disclosure of which is incorporated herein in its entirety by reference.

FIELD OF THE INVENTION

The present invention relates to wireless data communications, and more particularly, to data communications over a wireless local area network ("LAN").

DESCRIPTION OF THE RELATED ART

FIG. 1 shows an example of a Basic Service Set ("BSS") 100 according to a general wireless local area network ("LAN") standard (IEEE 802.11). As shown in FIG. 1, the BSS 100 includes an Access Point ("AP") 110 and a plurality of wireless LAN stations (STA1, STA2, and STA3) 120, 130, and 140.

According to the wireless LAN standard (IEEE 802.11), the wireless LAN station 120 communicates, via the access point 110, with the other wireless LAN stations 130 and 140. Likewise, the wireless LAN stations 130 and 140 communicate via the access point 110 with the other wireless LAN stations (120 and 140).

FIG. 2 shows an example of a Quality of Service ("QoS") capable Basic Service Set ("QBSS") 200 according to a general wireless LAN standard (IEEE 802.11e). The IEEE 802.11e standard was proposed for ensuring Quality of Service in a 802.11 MAC. As shown in FIG. 2, the QBSS 200 includes a QoS-capable Access Point ("QAP") 210 for ensuring QoS and QoS-capable wireless LAN stations ("QSTA") 220, 230, and 240, each of which supports QoS. The IEEE 802.11e standard proposes a direct link protocol ("DLP") capability whereby direct, high data throughput communications may be established between the wireless LAN stations 220 and 230, between the wireless LAN stations 230 and 240, and between the wireless LAN stations 240 and 220.

FIG. 3 is a block diagram illustrating a link setup process according to the DLP. FIG. 4 is a message flow diagram that illustrates flows of messages according to the link setup process with respect to FIG. 3. In FIG. 4, a station management entity ("SME") is an upper layer of an open system interconnection ("OSI"), and a medium access control ("MAC") is a lower layer of the OSI.

Referring to FIGS. 2 through 4, a primitive MDLP_REQ (denoted by "401" in FIG. 4) that is generated by the SME of the QSTA1 220 is sent to the MAC of the QSTA1 220 where it is transformed into a frame DLP_REQ (denoted by "1a" in FIGS. 3 and 4). As shown in FIGS. 3 and 4, the frame DLP_REQ is transmitted to the MAC of the QAP 210. Herein, the term "primitive" refers to data exchanged between an SME and a MAC, and the term "frame" refers to data exchanged between MACs. The MACs transform a "primitive" into a "frame" or a "frame" into a "primitive."

The frame DLP_REQ received by the MAC of the QAP 210 is transformed into a primitive MDLP_IND (denoted by "403" in FIG. 4). The MAC of the QAP 210 transmits the primitive MDLP_IND to the SME of the QAP 210. The SME of the QAP 210 receives the primitive MDLP_IND, generates a primitive MDLP_REQ (denoted by "405" in FIG. 4), and transmits the primitive MDLP_REQ to the MAC of the QAP 210.

Thereafter, the MAC of the QAP 210 transforms the primitive MDLP_REQ into a frame DLP_REQ (denoted by "1b" in FIGS. 3 and 4) and transmits the frame DLP_REQ to the MAC of the QSTA2 230. The MAC of the QSTA2 230 transforms the received frame DLP_REQ into a primitive MDLP_IND (denoted by "407" in FIG. 4) and transmits the primitive MDLP_IND to the SME of the QSTA2 230. The SME of QSTA2 230 receives the primitive MDLP_IND and transmits a confirmation primitive MDLP_CON (denoted by "409" in FIG. 4) to the MAC of the QSTA2 230.

The MAC of the QSTA2 230 transforms the confirmation primitive MDLP_CON into a response frame DLP_RES (denoted by "2a" in FIGS. 3 and 4) and transmits the response frame DLP_RES to the MAC of the QAP 210. The MAC of the QAP 210 transforms the response frame DLP_RES into a confirmation primitive MDLP_CON (denoted by "411" in FIG. 4) and transmits the confirmation primitive MDLP_CON to the SME of the QAP 210. The SME of the QAP 210 receives and confirms the confirmation primitive MDLP_CON and transmits the confirmed confirmation primitive MDLP_CON (denoted by "413" in FIG. 4) to the MAC of the QAP 210.

The MAC of the QAP 210 transforms the confirmation primitive MDLP_CON into a response frame DLP_RES (denoted by "2b" in FIGS. 3 and 4) and transmits the response frame DLP_RES to the MAC of the QSTA1 220. (As shown in FIG. 4, alternately, the MAC of the QSTA1 220 may output a probe DLP_PRB (denoted by "3" in FIG. 4) for DLP to the MAC of the QSTA2 230.) When the processes of 1a, 1b, 2a, and 2b are successfully completed, direct communication between the QSTA1 220 and the QSTA2 230 can be achieved. The MAC of the QSTA1 220 may transform the response frame DLP_RES into a confirmation primitive MDLP_CON, and output the confirmation primitive MDLP_CON to the SME of the QSTA1 220.

FIG. 5 is a graph showing a relationship between the link data rate and the range of a wireless LAN using the IEEE 802.11a and IEEE 802.11b standards. FIG. 6 is a graph showing a relationship between the data throughput and the range of the wireless LAN using the IEEE 802.11a and IEEE 802.11b standards. FIGS. 5 and 6 depict test results which were carried out using an actual product in an actual environment by ATHEROS® Communication Corporation. As shown in FIGS. 5 and 6, the data link rate and the throughput may decrease significantly as the distance between the wireless LAN stations increases. As a result, direct communication between the stations 220 and 230 in the QBSS 200 of FIG. 2 may not always better than the communication between the stations 220 and 230 via the QAP 210.

SUMMARY OF THE INVENTION

The present invention provides method and systems for stably supporting applications with Quality of Service (QoS) requirement in wireless LANs.

According to embodiments of the present invention, methods of establishing communications between a first station and a second station in a wireless local area network using a direct link protocol are provided in which both a first distance between the first station and the second station and a second distance between the first station and an access point in the wireless local area network are first determined. The first distance to the second distance may then be compared and direct link protocol communications may be established between the first station and the second station if the first distance is less than the second distance. The first distance may be determined based on the location of the first station and the location of the second station and the second distance may be determined based on the location of the first station and the location of the wireless access point in the local area network. In embodiments of the present invention, the location of the first station and the location of the second station may be determined using a global positioning system receiver.

In further embodiments of the present invention, direct link protocol communications may be established between the first station and the second station if the first distance is less than a predetermined multiple of the second distance. The predetermined multiple may be an integer (e.g., 2) or a non-integer multiple (e.g., 1.5).

In embodiments of the present invention, the access point in the wireless local area network may perform the comparison between the first distance to the second distance. The methods may also include the step of transmitting the location of the first station to the access point in the wireless local area network and transmitting the location of the second station to the access point in the wireless local area network. The location of the first station and the location of the second station may be periodically transmitted to the access point and/or may be transmitted to the access point in response to a polling request sent by the access point.

In other embodiments of the present invention, the first station may perform the comparison between the first distance to the second distance. In these embodiments the first station may transmit a request frame to the second station via the access point in the wireless network, and the location of the second station and a location of the access point in the wireless network may be transmitted to the first station in a response to the request frame. The first station may extract the location of the second station and the location of the access point from this response frame and then determine the first distance and the second distance based on the extracted location information. The body of this response frame may include separate fields for storing the location of the second station and for storing the location of the access point.

Pursuant to additional embodiments of the present invention, methods of determining whether to route communications between a first station and a second station in a wireless local area network using a direct link protocol are provided. Pursuant to these methods, the distance between the first station and the second station and the distance between the first station and an access point in the wireless area network may be compared and, based on this comparison, it may be determined whether to route communications between the first station and the second station in the wireless local area network using the direct link protocol. For example, in embodiments of the present invention it may be determined that direct link protocol communications should be used where the distance between the first station and the second station is less than the distance between the first station and the access point in the wireless area network. In other embodiments, it may be determined that direct link protocol communications should be used where the distance between the first station and the second station is less than a predetermined multiple (e.g., 2) of the distance between the first station and the access point in the wireless area network. The distance between the first station and the second station and the distance between the first station and the access point in the wireless area network may be determined based on the locational coordinates of the first station, the second station and/or the access point in the wireless local area network.

Pursuant to these methods, the first station may transmit a request to the second station requesting the establishment of communications. The second station may respond to this request by transmitting its location to the first station along with the location of the access point. The first station may extract the location of the second station and the location of the access point from the response and then determine the distance between the first station and the second station and the distance between the first station and the access point based on the extracted location information.

In other embodiments of the present invention, the access point may store the location of the first station and the location of the second station. Upon receiving a request from the first station to establish communications with the second station, the access point may determine the distance between the first station and the second station and the distance between the first station and the access point based on the stored locations of the first station and the second station.

According to further embodiments of the present invention, wireless local area networks are provided that include an access point and a plurality of wireless local area network stations. Each of the plurality of stations may include a location tracking device (e.g., a global positioning system receiver), a processor that determines the distance between the station and a second station in the wireless local area network and the distance between the station and the access point, and a decision algorithm. The decision algorithm may be software and/or hardware that determines, based on the respective distances between the station and the second station in the wireless local area network and between the station and the access point, whether to establish direct link protocol communications between the station and the second station in the wireless local area network.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
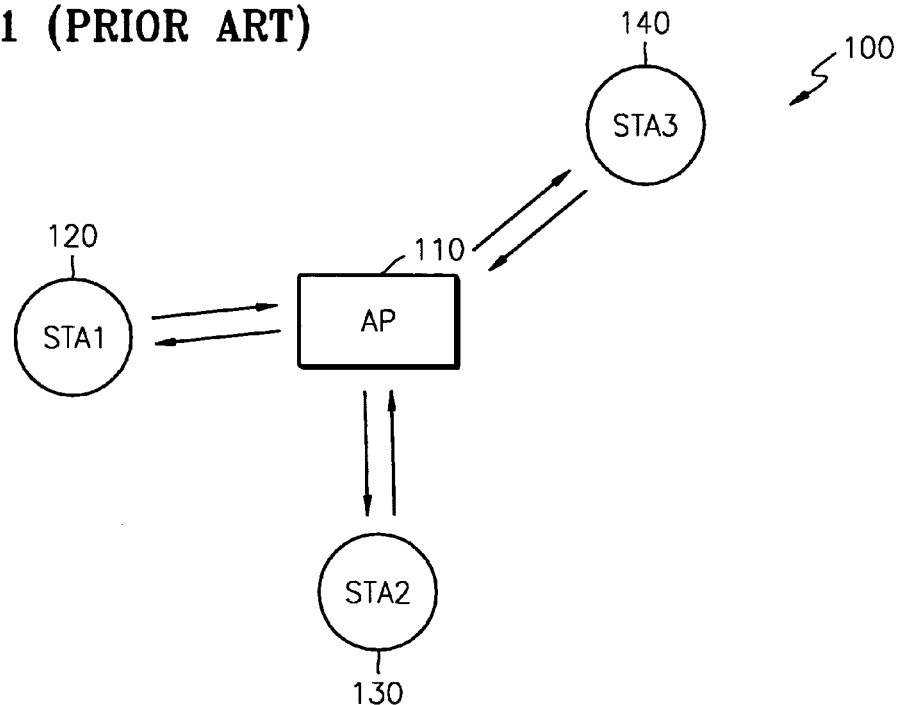
FIG. 1 is a block diagram of a BSS according to a general wireless LAN standard (IEEE 802.11)
Figure 2:
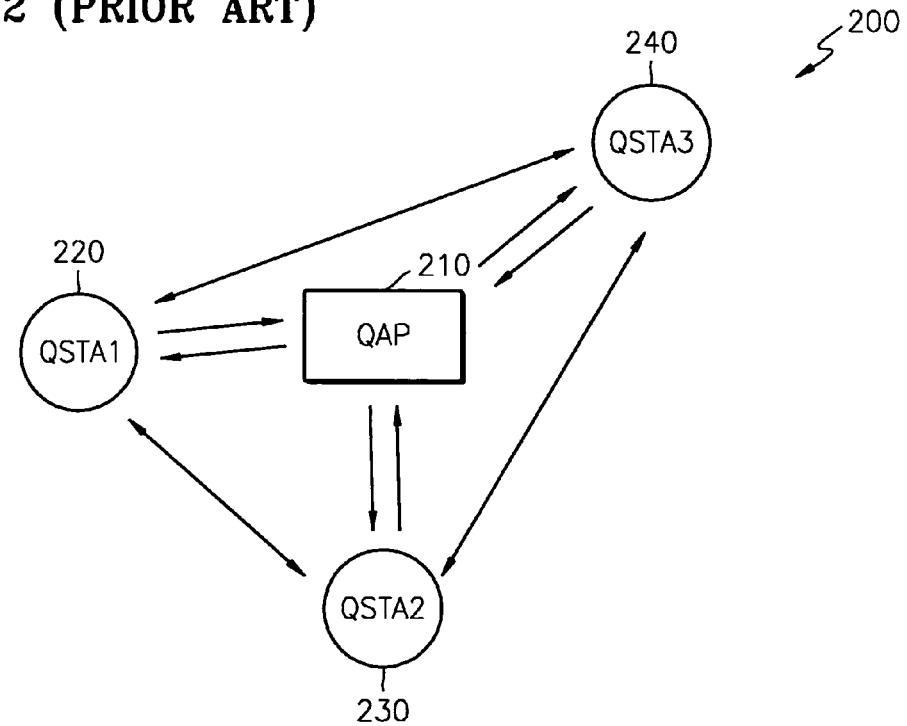
FIG. 2 is a block diagram of a QBSS according to a general IEEE 802.11e standard.

The present invention will now be described more fully with reference to the accompanying drawings, in which typical embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 7:
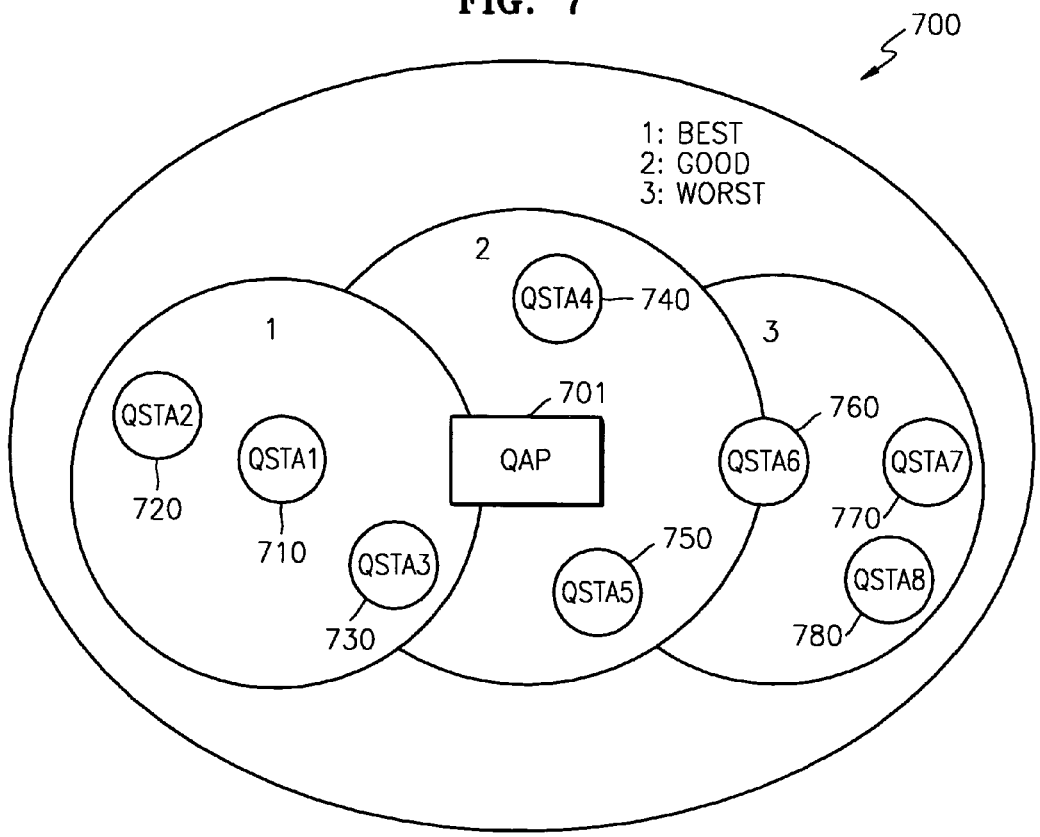
FIG. 7 is a schematic illustrating a relationship of the performance to the communication range when a DLP is set between stations for ensuring QoS according to embodiments of the present invention.

Referring to FIG. 7, a wireless LAN 700 represents a QoS-capable Basic Service Set ("QBSS"). As shown in FIG. 7, the wireless LAN 700 includes a QoS-capable Access Point ("QAP") 701 and a plurality QoS-capable stations QSTA1 through QSTA8 710, 720, 730, 740, 750, 760, 770, 780, each of which support QoS. Each of the QAP 701 and QSTAs 710 through 780 may include a location tracking device that uses, for example, a Global Positioning System (GPS).

FIG. 7 also shows how the performance of DLP may vary with the distance between the station QSTA1 710 and the respective stations 720 through 780 and the distance between the QSTA1 710 and the QAP 701. As shown in FIG. 7, the area denoted by "1" represents the area which is the best case for DLP, the area denoted by "2" represents the area which may be a good case for DLP, and the area denoted by "3" represents the area that is the worst case for DLP. Thus, in the example of FIG. 7, the QSTA1 710 and QSTA2 720 carry out a DLP under the best conditions, the QSTA 710 and QSTA4 740 carry out a DLP under good conditions, and the QSTA1 710 and the QSTA7 770 carry out a DLP under the worst conditions.

It will be appreciated by those of skill in the art that the areas in FIG. 7 that are denoted as the "best" case, as a "good" case and as the "worst" case are done so with respect to each other in an exemplary communications environment. Depending upon the actual equipment used and the communication environment the classification of particular areas may change. There may also be systems where no stations reside in one or more of the classification of areas set forth above. Thus, it will be appreciated that FIG. 7 is provided to better explain the present invention to those of skill in the art and is not intended to limit the invention in any way.

Figure 8:
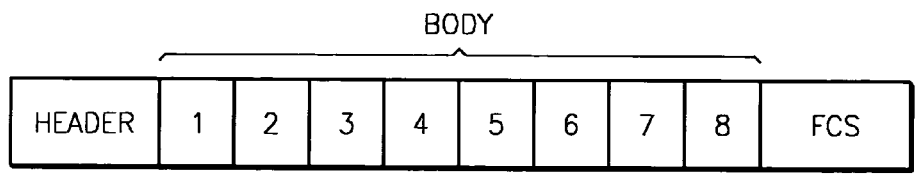
FIG. 8 shows a body of an action frame according to embodiments of the present invention.

FIG. 8 shows a body of an action frame that may be used with embodiments of the present invention. As shown in FIG. 8, the action frame may include a header, a body, and a frequency check sequence (FCS). In the exemplary frame depicted in FIG. 8, the first field 1 may contain a destination address, the second field 2 may contain a source MAC address, the third field 3 may contain a status field, the fourth field 4 may contain capability information, the fifth field 5 may contain supported bit rates, the sixth field 6 may contain extended capability, the seventh field 7 may contain location information for the stations, and the eighth field 8 may contain location information for the access point. In embodiments of the present invention, the location information for the stations stored in the seventh field and the location information for the access point stored in the eighth field may be represented by spatial coordinates. However, it will be appreciated that other methods for specifying location may be used.

Figure 9:
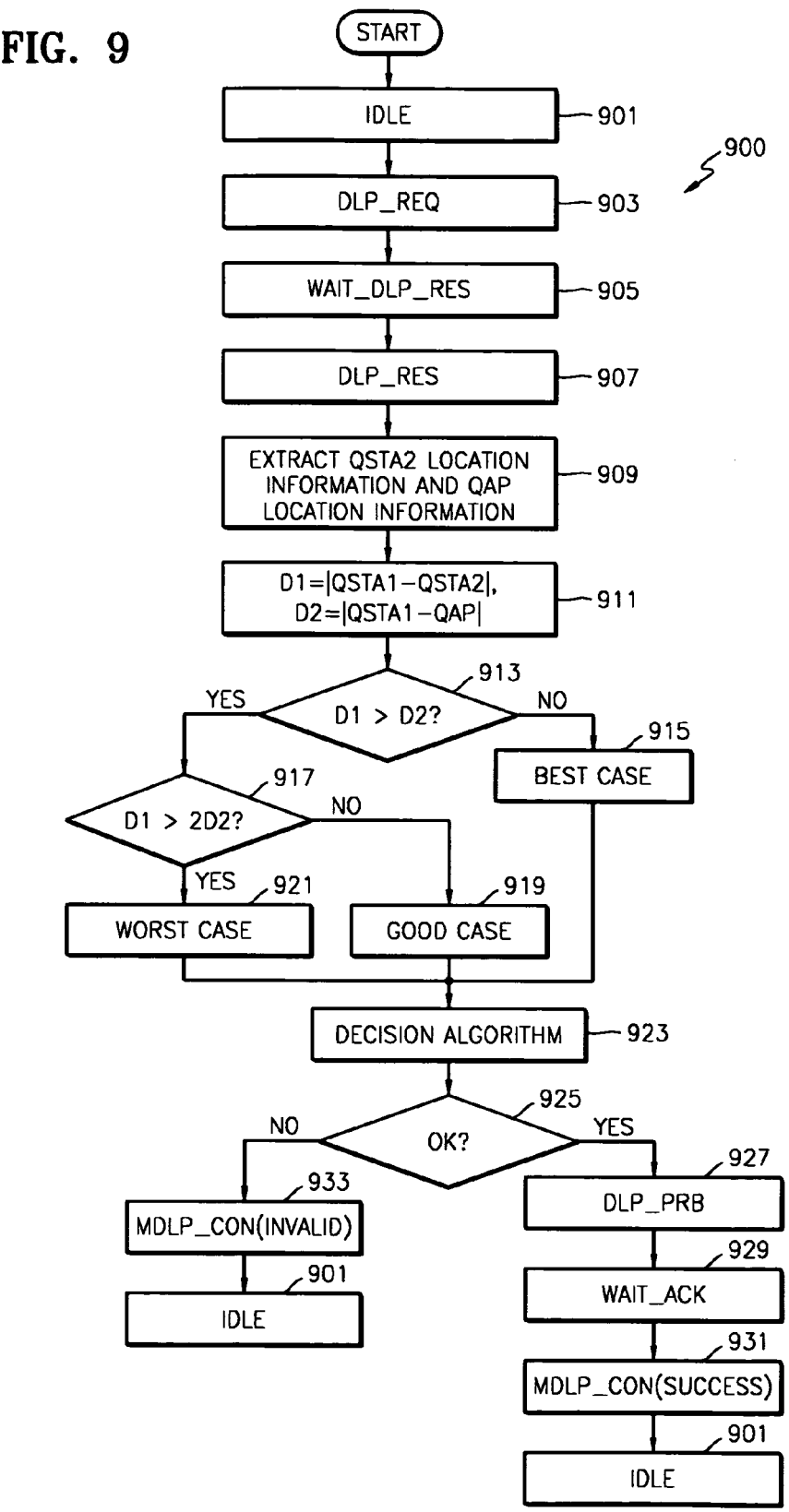
FIG. 9 is a flow chart illustrating a method of measuring distances between the stations for ensuring QoS, according to embodiments of the present invention.

FIG. 9 is a flow chart illustrating methods of measuring distances between the stations to ensure that QoS requirements are met according to embodiments of the present invention. As shown with reference to FIGS. 3, 4, 7, 8 and 9, direct link protocol communications may be established between a first station QSTA1 710 and a second station QSTA2 720 of the wireless LAN 700 according to embodiments of the present invention as follows. As shown in FIG. 9, the wireless stations QSTA1 710 and QSTA2 720 may start in an idle status IDLE (step 901). Then, the first station 710 may transmit a request frame DLP_REQ to the second station 720 via the QAP 701 (step 903). The first station may then wait for a response frame DLP_RES (step 905). In response to the request frame DLP_REQ, the second station 720 may load and transmit its location information in the seventh field of the response frame (see FIG. 8) to the QAP 701. As described above, the location information can be provided, for example, using a Global Positioning System. The QAP 701 receives the response frame, and loads and transmits its location information in the eighth field of the response frame (see FIG. 8) to the first station 710 (step 907).

The first station 710 may then extract the location information of the second station 720 and the location information of the QAP 701 from the seventh and the eighth fields of the response frame transmitted from the QAP 701 (step 909). The first station 710 then may determine the distance (referred to as "D1") between the first station 710 and the second station 720 and the distance (referred to as "D2") between the first station 710 and the QAP 701 using the extracted location information (step 911). This may be accomplished, for example, using the following equation 1:

$$D1 = \sqrt{(X1-X2)^2 + (Y1-Y2)^2 + (Z1-Z2)^2}$$

$$D2 = \sqrt{(X1-X)^2 + (Y1-Y)^2 + (Z1-Z)^2} \quad (1)$$

where (X1, Y1, Z1) represents the three-dimensional location information of the first station 710, (X2, Y2, Z2) represents the three-dimensional location information of the second station 720, and (X, Y, Z) represents the three-dimensional location information of the QAP 701.

The first station 710 may then compare the distance D1 with the distance D2 (step 913). In this particular embodiment, if the distance D1 is smaller than the distance D2, the first station 710 and second station 720 may be classified as being in the best condition for establishing communications using a DLP (step 915). If, on the other hand, the distance D1 is greater than the distance D2 at step 913, the first station 710 may proceed to determine whether the distance D1 is greater than a predetermined multiple of the distance D2. This predetermined multiple may be, but need not be, an integer multiple. In embodiments of the present invention, the first station 710 may determine whether the distance D1 is greater than double the distance D2 (step 917).

In a case where the distance D1 is greater than double the distance D2, the DLP between the first station 710 and the second station 720 may be classified as the worst condition (step 921). However, if the distance D1 is greater than the distance D2 but less than double the distance D2, the DLP between the first station 710 and the second station 720 may be classified as a good condition (step 919). It will be appreciated by those of skill in the art in light of the present disclosure that in embodiments of the present invention, step 913 may be omitted and that in other embodiments of the present invention step 917 may be omitted.

A predetermined decision algorithm may be stored in the first station 710 to decide an allowable range of the DLP (step 923). This decision algorithm may perform the comparisons of the distances D1 and D2 (or predetermined multiples thereof), or separate software/hardware may be used to perform those comparisons. The decision algorithm may be implemented in MAC firmware of the first station 710. Each of the stations 710 through 780 may have the decision algorithm implemented in the MAC firmware.

In embodiments of the present invention, the decision algorithm can allow a DLP between the first station 710 and the second station 720 only for the best conditions (steps 915 and 923). In other embodiments of the present invention, the decision algorithm may allow the DLP between the first station 710 and the second station 720 for both good conditions and the best conditions (steps 915, 919 and 923). If the results of steps 915, 919, and 921 satisfy the decision algorithm, the first station 710 transmits a probe for DLP to the second station 720 (step 927) and waits for an acknowledgement signal ACK output from the second station 720 (step 929).

If the first station 710 receives the acknowledgement signal ACK from the second station 720, the MAC of the first station 710 transmits a success primitive to its own SME (step 931) setting the DLP between the first station 710 and the second station 720. The first station 710 may then remain at an idle status until a new message is generated (step 901).

However, if the results of steps 915, 919, 921 do not satisfy the decision algorithm, the MAC of the first station 710 may transmit a failure primitive to its own SME (step 933). The first station 710 may then remain at an idle status until a new message is generated (step 901).

An example where the first station 710 attempts to establish a DLP with the seventh station 770 according to embodiments of the present invention will now be described with reference to FIGS. 3, 7, 8 and 9. In this example, it is assumed that the decision algorithm that is executed at step 923 of FIG. 9 is set so as to allow a DLP between the first station 710 and the seventh station 770 for both the best conditions (which in this particular embodiment are defined as D1<D2) and good conditions (which in this particular embodiment is defined as D2<D1<2*D2).

As shown in FIG. 9, the respective stations 710 and 770 first remain in an idle state IDLE (step 901). Then, the first station 710 transmits the request frame DLP_REQ to the seventh station 770 via the QAP 701 (step 903) and waits for a response frame DLP_RES (step 905). In response to the request frame DLP_REQ, the seventh station 770 loads and transmits its location information in the seventh field of the response frame DLP_RES (see FIG. 8) to the QAP 701. The QAP 701 receives the response frame DLP_RES, and loads and transmits its location information in the eighth field of the response frame (see FIG. 8) to the first station 710 (step 907).

The first station 710 extracts the location information of the seventh station 770 and the location information of the QAP 701 from the seventh and eighth fields of the response frame transmitted from the access point 701 (step 909). Based on this extracted information, the first station 710 may then determine the distance (referred to as "D1") between the first station 710 and the seventh station 770 and the distance (referred to as "D2") between the first station 710 and the QAP 701. This may be accomplished, for example, using the following equation 2 (step 911).

$$D1 = \sqrt{(X1-X7)^2 + (Y1-Y7)^2 + (Z1-Z7)^2}$$

$$D2 = \sqrt{(X1-X)^2 + (Y1-Y)^2 + (Z1-Z)^2} \qquad (2)$$

where (X1, Y1, Z1) represents the three-dimensional location information of the first station 710, (X7, Y7, Z7) represents the three-dimensional location information of the seventh station 770, and (X, Y, Z) represents the three-dimensional location information of the QAP 701.

The first station 710 may then compare the distance D1 with the distance D2 (step 913). If the distance D1 is greater than the distance D2, the first station 710 carries out step 917. If the distance D1 is greater than double the distance D2, the DLP between the first station 710 and the seventh station 770 is classified as being in the worst conditions (step 921). Since the result (step 921) of step 917 does not satisfy the decision algorithm (steps 923 and 925), the MAC of the first station 710 may transmit a failure primitive MDLP_CON(IN-VALID) to the SME of the first station 710 (step 933). The first station 710 may then remain in an idle status until a new message is generated (step 901).

A case where the stations are directly linked to each other using the location information of the respective stations 710 through 780, according to further embodiments of the present invention, will be described as follows. In these embodiments, the stations 710 through 780 may transmit their location information periodically to the access point 701. This location information for the respective stations 710 through 780 may then be stored, for example, in a database of the access point 701.

If the first station 710 transmits a request frame to the access point 701 in order to set a DLP with the seventh station 770, the access point 701 may compare the distance between the first station 710 and the seventh station 770 with the distance between the first station 710 and the access point 701, using the location information stored in its database (steps 913 and 917).

Figure 3:
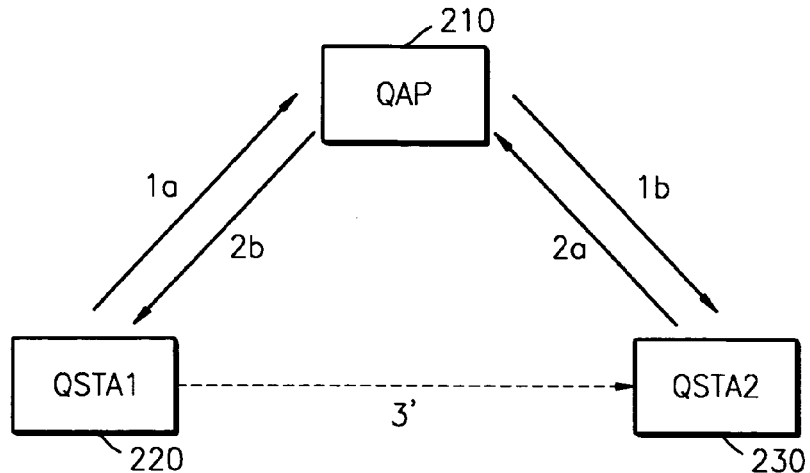
FIG. 3 is a block diagram of a QBSS that implements direct link protocol.
Figure 4:
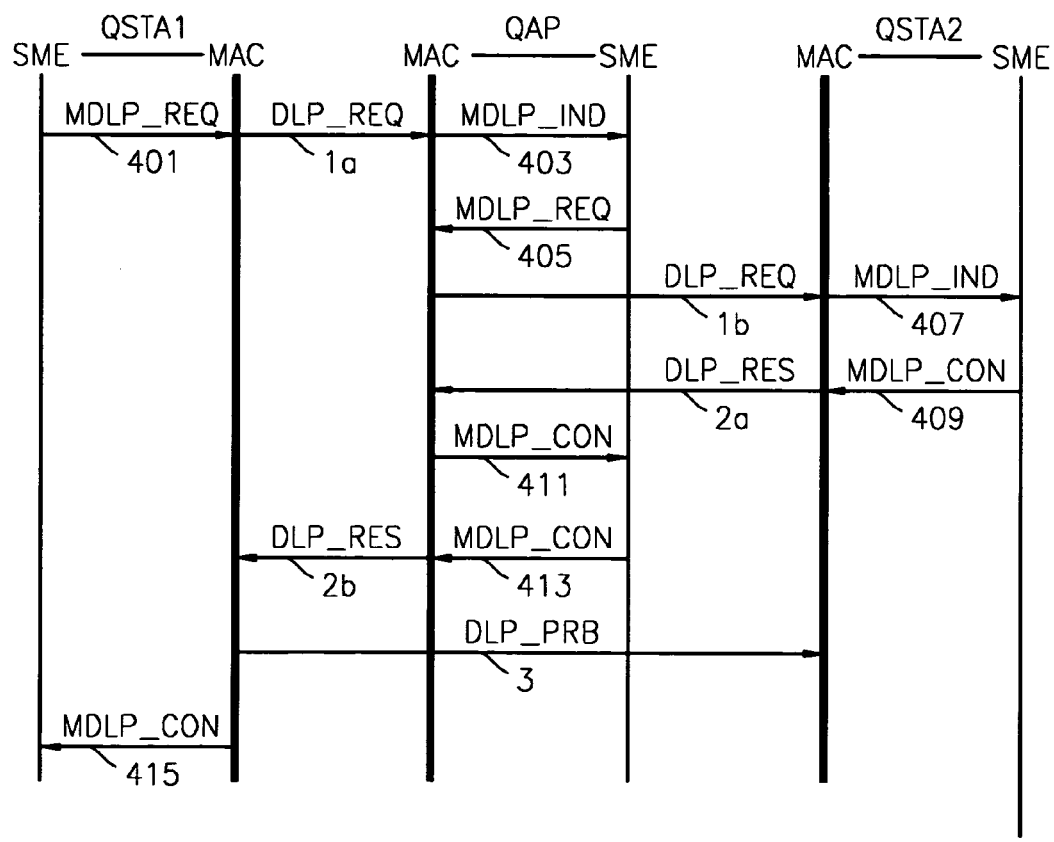
FIG. 4 is a message flow diagram illustrating the flow of messages according to the link setup process with respect to FIG. 3.
Figure 5:
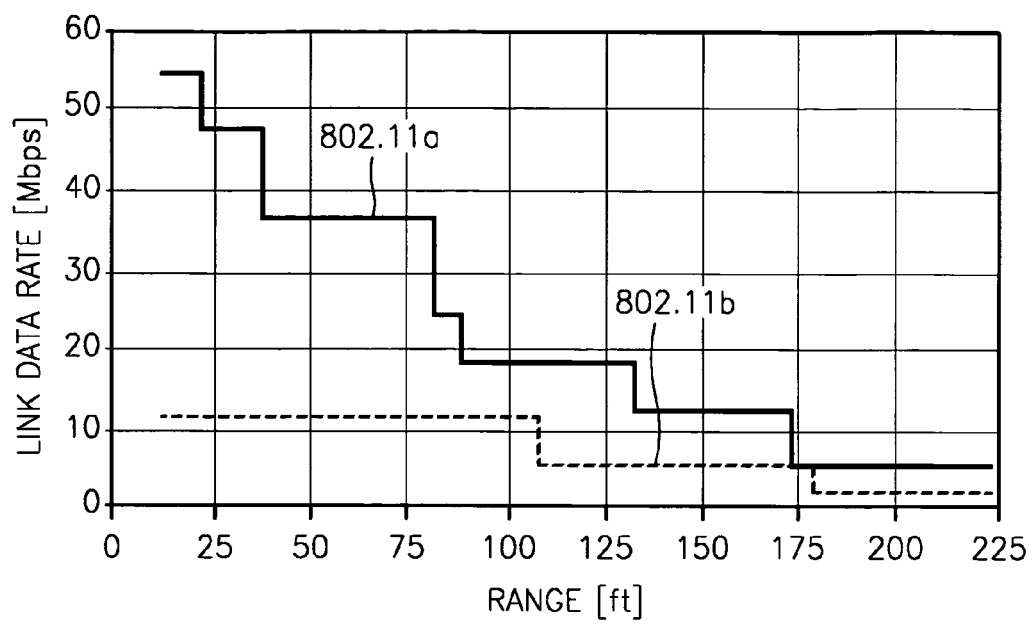
FIG. 5 is a graph of actual test results that show the relationship of the link data rate and the range of a wireless LAN using the IEEE 802.11a and IEEE 802.11b standards.
Figure 6:
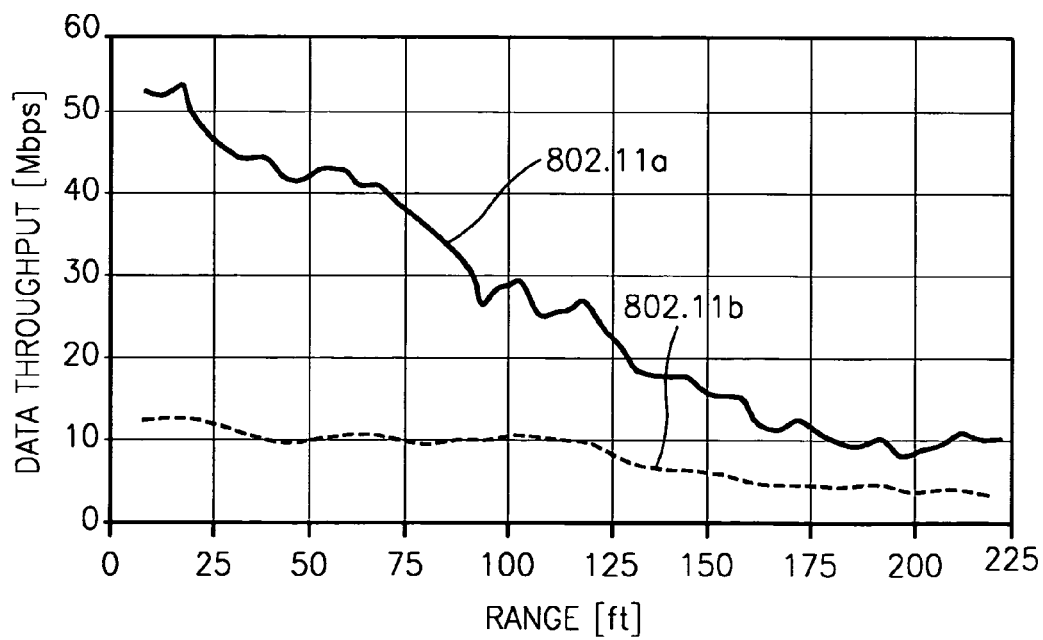
FIG. 6 is a graph of actual test results that show the relationship of the data throughput to the range of the wireless LAN using the IEEE 802.11a and IEEE 802.11b standards.

If the comparison result represents the worst case (step 921), the access point 701 does not perform the processes 1b and 2a shown in FIG. 3 and directly performs the process 2b. That is, the access point 701 outputs the result indicating the worst conditions to the first station 710. Accordingly, in this case, the frame exchange between the access point 701 and the seventh station 770 corresponding to processes 1b and 2a in FIG. 3 is rendered unnecessary.

A case where a DLP between the stations is performed using the location information of the respective stations 710 through 780, according to additional embodiments of the present invention, will be described as follows. In these embodiments, the stations 710 through 780 transmit their location information to the access point 701 through polling of the access point 701. The transmitted location information of the respective stations 710 through 780 may then be stored in the database of the access point 701.

If the first station 710 transmits a request frame to the access point 701 in order to set a DLP with the seventh station 770, the access point 701 compares the distance between the first station 710 and the seventh station 770 with the distance between the first station 710 and the access point 701, using the location information stored in the database (steps 913 and 917). If the comparison result indicates the worst conditions (step 921), the access point 701 does not perform the processes 1b and 2a shown in FIG. 3 and directly performs the process 2b. That is, the access point 701 outputs the result indicating the worst conditions to the first station 710. Accordingly, in this case, unnecessary frame exchange between the access point 701 and the seventh station 770 is removed.

As described above, according to the present invention, since a distance between stations to be directly linked to each other can be perceived in advance, it is possible to selectively support a DLP according to the distance between the stations, thereby ensuring stable QoS in the wireless LAN.

According to still further embodiments of the present invention, additional information may be used in determining whether or not to establish DLP communications between two stations in a wireless LAN. By way of example, the decision algorithm may consider both the (1) relative difference between a first station and the access point as compared to the distance between the first station and the second station and (2) the absolute distance between the first station and the second station. If the absolute distance between the first station and the second station exceeds a threshold value, the DLP may not be established, even though the distance between the first station and the second station is less than a predefined multiple of the distance between the first station and the access point. It will also be appreciated that more complex decision algorithms may be employed.

Pursuant to still further embodiments of the present invention, other factors such as received signal strength may be used in addition to, or instead of, location/distance information to determine whether or not to establish DLP communications between a first station and a second station in the wireless LAN. Such embodiments may be particularly useful in situations where terrain variations impact signal quality. In one such embodiment of the present invention the access point would record the received signal strength of the signal containing the request frame from the first station and transmit this information in the response frame that is sent to the first station. The first station would then send a request message directly to the second station and the second station would likewise measure the received signal strength and transmit the information in the response frame that is sent to the first station. The first station may then implement a decision algorithm based on, for example, the respective received signal strengths and/or a combination of the received signal strengths and the distance/location information discussed above with respect to other embodiments of the present invention to determine whether or not to implement DLP communications between the first station and the second station. In one such embodiment of the present invention the received signal strength information may be used to dynamically set the "predetermined" multiple illustrated in step 917 of FIG. 9.

While this invention has been particularly shown and described with reference to preferred embodiments thereof, it will be understood by those skilled in the art that various changes in form and details may be made therein without departing from the spirit and scope of the invention as defined by the appended claims and equivalents.

What is claimed is:

1. A method of establishing communications between a first station and a second station in a wireless local area network using a direct link protocol, comprising:
   determining a first distance between the first station and the second station;
   determining a second distance between the first station and an access point in the wireless local area network;
   comparing the first distance to the second distance; and
   establishing direct link protocol communications between the first station and the second station if the first distance is less than the second distance.

2. The method of claim 1, further comprising establishing direct link protocol communications between the first station and the second station if the first distance is less than a predetermined multiple of the second distance.

3. The method of claim 2, wherein the predetermined multiple is two.

4. The method of claim 1, wherein the access point in the wireless local area network compares the first distance to the second distance.

5. The method of claim 4, further comprising transmitting the location of the first station to the access point in the wireless local area network and transmitting the location of the second station to the access point in the wireless local area network.

6. The method of claim 5, wherein the location of the first station and the location of the second station are periodically transmitted to the access point in the wireless local area network.

7. The method of claim 5, wherein the location of the first station and the location of the second station are each transmitted to the access point in the wireless local area network in response to a polling request sent by the access point in the wireless local area network.

8. The method of claim 5, wherein the location of the first station and the location of the second station that are transmitted to the access point are represented in spatial coordinates.

9. The method of claim 1, wherein the first station compares the first distance to the second distance.

10. The method of claim 9, further comprising:
    receiving at the first station a response frame from the access point in the wireless local area network; and
    extracting the location of the second station and the location of the access point in the wireless local area network from the response frame; and
    wherein the first distance and the second distance are determined based on the extracted location information.

11. The method of claim 10, wherein a body of the response frame includes:
    a field for storing the location of the second station; and
    a field for storing the location of the access point in the wireless local area network.

12. The method of claim 1, wherein the first distance is determined based on a location of the first station and a location of the second station, and wherein the second distance is determined based on a location of the first station and a location of the wireless access point in the local area network.

13. The method of claim 12, further comprising:
    transmitting a request frame from the first station to the second station via the access point in the wireless network; and
    transmitting a location of the second station and a location of the access point in the wireless network to the first station in a response to the request frame.

14. The method of claim 12, wherein the location of the first station and the location of the second station are determined using a global positioning system receiver.

15. A computer-readable medium having computer-executable instructions for performing the steps recited in claim 1.

16. A method of determining whether to route communications between a first station and a second station in a wireless local area network using a direct link protocol, comprising:
    determining a distance between the first station and the second station;
    determining a distance between the first station and an access point in the wireless area network; and
    determining whether to route communications between the first station and the second station in the wireless local area network using the direct link protocol based at least in part on the determined distances,
    wherein determining whether to route communications between the first station and the second station in the wireless local area network using the direct link protocol based on at least in part on the determined distances comprises determining that direct link protocol communications will be established between the first station and the second station if the distance between the first station and the second station is less than the distance between the first station and the access point in the wireless area network.

17. The method of claim 16, wherein the distance between the first station and the second station and the distance between the first station and the access point in the wireless area network are determined based on a locational coordinates of the first station, the second station and the access point in the wireless local area network.

18. The method of claim 17, wherein at least the first station and the second station include a global positioning system receiver for determining the locational coordinates of the respective first station and second station.

19. The method of claim 18, wherein determining whether to route communications between the first station and the second station in the wireless local area network using the direct link protocol based at least in part on the determined distances comprises determining that direct link protocol communications will be established between the first station and the second station if the distance between the first station and the second station is less than a predetermined multiple of the distance between the first station and the access point in the wireless area network.

20. The method of claim 19, wherein the predetermined multiple is two.

21. The method of claim 16, further comprising:
transmitting to the second station a request from the first station to establish communications with the second station;
transmitting to the first station a location of the second station and a location of the access point in the wireless network in a response to the request from the first station to establish communications with the second station;
extracting the location of the second station and the location of the access point in the wireless local area network from the response; and
determining the distance between the first station and the second station and the distance between the first station and the access point in the wireless area network based on the extracted location information.

22. The method of claim 16, further comprising:
storing at the access point in the wireless network the location of the first station and the location of the second station;
receiving at the access point in the wireless network a request from the first station to establish communications with the second station;
determining the distance between the first station and the second station and the distance between the first station and the access point in the wireless area network based on the stored locations of the first station and the second station.

23. A wireless local area network, comprising:
an access point; and
a plurality of wireless local area network stations, each station including:
a location tracking device;
a processor that determines a first distance between the station and a second of the stations in the wireless local area network and a second distance between the station and the access point,
wherein the processor determines based on the first distance and the second distance whether to establish direct link protocol communications between the station and the second station in the wireless local area network if the first distance is less than the second distance.

24. The wireless local area network of claim 23, wherein the location tracking device comprises a global positioning system receiver.

25. The wireless local area network of claim 24, wherein the processor elects to establish direct link protocol communications between the station and the second station in the wireless network if the first distance between the station and the second station in the wireless local area network is less than a predetermined multiple of the second distance between the station and the access point.

* * * * *